US011417338B2

(12) United States Patent
Hahm et al.

(10) Patent No.: US 11,417,338 B2
(45) Date of Patent: Aug. 16, 2022

(54) ELECTRONIC APPARATUS AND CONTROL METHOD FOR CONTROLLING A DEVICE IN AN INTERNET OF THINGS

(71) Applicant: Samsung Electronics Co., Ltd., Suwon-si (KR)

(72) Inventors: Seongil Hahm, Suwon-si (KR); Taejun Kwon, Suwon-si (KR); Venkatraman Iyer, Suwon-si (KR); Daesung An, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 108 days.

(21) Appl. No.: 16/523,184

(22) Filed: Jul. 26, 2019

(65) Prior Publication Data
US 2020/0043497 A1 Feb. 6, 2020

(30) Foreign Application Priority Data

Aug. 2, 2018 (KR) .................. 10-2018-0090401

(51) Int. Cl.
*H04W 4/029* (2018.01)
*G10L 15/16* (2006.01)
(Continued)

(52) U.S. Cl.
CPC .............. *G10L 15/26* (2013.01); *G06F 1/163* (2013.01); *G06K 19/07762* (2013.01);
(Continued)

(58) Field of Classification Search
CPC ....... G10L 15/26; G10L 15/22; G10L 15/075; G10L 2015/227; G10L 2015/223;
(Continued)

(56) References Cited

U.S. PATENT DOCUMENTS 7,768,420 B2    8/2010   Neogi et al.
10,341,981 B2   7/2019   Yu et al.
(Continued)

FOREIGN PATENT DOCUMENTS

KR      10-1072709 B1      10/2011
KR   10-2016-0111880 A      9/2016
(Continued)

OTHER PUBLICATIONS

International Search Report dated Nov. 20, 2019, issued in International Patent Application No. PCT/KR2019/009508.
(Continued)

*Primary Examiner* — Michael N Opsasnick
(74) *Attorney, Agent, or Firm* — Jefferson IP Law, LLP

(57) ABSTRACT

An electronic apparatus and method of controlling the electronic apparatus are provided. The electronic apparatus includes a communicator, a storage storing information on places wherein Internet of Things (IoT) devices are located, and a processor configured to, based on receiving a control signal for controlling an IoT device located in a specific place through the communicator, control the IoT device located in the specific place based on information on the place stored in the storage. The processor is further configured to receive motion information generated based on a motion of a wearable device from the wearable device, identify a place corresponding to the motion information, and store the identified place as information on a place of an IoT device located within a predetermined distance from the wearable device, in the storage.

21 Claims, 19 Drawing Sheets

(51) Int. Cl.
  *G06F 1/16* (2006.01)
  *G10L 15/22* (2006.01)
  *G10L 15/07* (2013.01)
  *H04W 4/021* (2018.01)
  *G06K 19/077* (2006.01)
  *G10L 15/26* (2006.01)

(52) U.S. Cl.
  CPC ............ *G10L 15/075* (2013.01); *G10L 15/22* (2013.01); *H04W 4/021* (2013.01); *H04W 4/029* (2018.02); *G10L 2015/223* (2013.01); *G10L 2015/227* (2013.01)

(58) Field of Classification Search
  CPC ........ G10L 17/00; G06F 1/163; H04W 4/029; H04W 4/021; H04W 4/70; G06K 19/07762; H04L 67/125
  See application file for complete search history.

(56) References Cited

U.S. PATENT DOCUMENTS

| | | | |
|---|---|---|---|
| 2012/0032819 A1 | 2/2012 | Chae et al. | |
| 2014/0244710 A1* | 8/2014 | Sharma | H04L 69/24 709/201 |
| 2015/0160622 A1* | 6/2015 | Kim | G06F 3/014 368/9 |
| 2015/0162006 A1 | 6/2015 | Kummer | |
| 2016/0070900 A1* | 3/2016 | Kim | H04W 12/50 726/3 |
| 2016/0295364 A1 | 10/2016 | Zakaria | |
| 2017/0046947 A1 | 2/2017 | Hou et al. | |
| 2017/0060298 A1* | 3/2017 | Hwang | G06F 1/163 |
| 2017/0067982 A1 | 3/2017 | Pan et al. | |
| 2017/0149928 A1 | 5/2017 | George et al. | |
| 2017/0186430 A1* | 6/2017 | Sharifi | G10L 15/22 |
| 2017/0193995 A1* | 7/2017 | Sharifi | G10L 15/063 |
| 2017/0289663 A1* | 10/2017 | Lee | G06F 3/017 |
| 2018/0158288 A1* | 6/2018 | Logan | G01S 19/51 |
| 2018/0166078 A1* | 6/2018 | Sharifi | G06F 3/167 |
| 2018/0190096 A1* | 7/2018 | Lundy | G08C 17/02 |
| 2018/0224804 A1* | 8/2018 | Berardinelli | G04G 99/006 |
| 2018/0249435 A1 | 8/2018 | Yu et al. | |
| 2018/0254045 A1* | 9/2018 | Sharifi | G10L 15/285 |
| 2018/0367329 A1 | 12/2018 | Shin | |
| 2019/0108840 A1* | 4/2019 | Sharifi | G06F 3/167 |
| 2019/0130914 A1* | 5/2019 | Sharifi | G10L 15/32 |

FOREIGN PATENT DOCUMENTS

| | | |
|---|---|---|
| KR | 10-2017-0027627 A | 3/2017 |
| KR | 10-1728052 B1 | 5/2017 |
| KR | 10-1755533 B1 | 7/2017 |
| KR | 10-1759196 B1 | 7/2017 |
| WO | 2017/039140 A1 | 3/2017 |

OTHER PUBLICATIONS

European Search Report dated Jul. 14, 2021, issued in European Patent Application No. 19843764.2.

\* cited by examiner

FIG. 5

| Activity | Place |
|---|---|
| TV watching | Living room |
| Sleeping | Bed room |
| Washing | Rest room |
| Eating | Kitchen |

FIG. 6

| Device | Place |
|---|---|
| TV | Living room |
| Lamp | Bed room |
| Faucet | Rest room |
| Microwave range | Kitchen |

FIG. 10

| Activity | Matched (%) |
|---|---|
| TV watching | 70 (%) |
| Sleeping | 3 (%) |
| Washing | 10 (%) |
| Eating | 40 (%) |

FIG. 11

| Activity | Matched (%) |
|---|---|
| TV watching | 70 (%) |
| Sleeping | 3 (%) |
| Washing | 10 (%) |
| Eating | 65 (%) |

FIG. 13

| Device | Power | Matched (%) | Weight (%) |
|---|---|---|---|
| TV | On | 70 (%) | 30 (%) |
| Lamp | Off | 3 (%) | 15 (%) |
| Faucet | Off | 10 (%) | 40 (%) |
| Microwave range | On | 65 (%) | 50 (%) |

FIG. 14

| Device | Power | Matched (%) | Weight (%) |
|---|---|---|---|
| TV | On | 70 (%) | 30 (%) |
| Lamp | Off | 3 (%) | 15 (%) |
| Faucet | Off | 10 (%) | 40 (%) |
| Microwave range | On | 65 (%) | 50 (%) |

| Time | Event |
|---|---|
| 07121100 | Power on |
| 07121520 | Volume up |
| 07121800 | Power off |
| 07121830 | Power on |

Current Time : 07121840

| Time | Event |
|---|---|
| 07121829 | Power on |
| 07121830 | Warm up |
| 07121835 | Power off |

FIG. 15

| Device | Power | Matched (%) | Weight (%) |
|---|---|---|---|
| TV | On | 70 (%) | 30 (%) |
| Lamp | Off | 3 (%) | 15 (%) |
| Faucet | Off | 10 (%) | 10 (%) |
| Microwave range | Off | 65 (%) | 0 (%) |

| Time | Event |
|---|---|
| 07121100 | Power on |
| 07121520 | Volume up |
| 07121830 | Power off |
| 07122100 | Power on |

Current Time : 07122130

| Time | Event |
|---|---|
| 07111829 | Power on |
| 07111830 | Warm up |
| 07111835 | Power off |

ELECTRONIC APPARATUS AND CONTROL METHOD FOR CONTROLLING A DEVICE IN AN INTERNET OF THINGS

CROSS-REFERENCE TO RELATED APPLICATION(S)

This application is based on and claims priority under 35 U.S.C. § 119(a) of a Korean patent application number 10-2018-0090401, filed on Aug. 2, 2018, in the Korean Intellectual Property Office, the disclosure of which is incorporated by reference herein in its entirety.

BACKGROUND

1. Field

The disclosure relates to an electronic apparatus and a control method thereof, and more particularly, to an electronic apparatus which is capable of controlling an Internet of Things (IoT) device, and a control method thereof.

2. Description of Related Art

Following the development of semiconductor technologies and wireless communication technologies, development of various technologies is proceeding. In particular, recently, an IoT technology which is a technology enabling real-time transmission and receipt of data between things has been developed.

An IoT technology is an evolved form of a conventional ubiquitous sensor network (USN) or machine to machine (M2M) communication, and is characterized by connecting things equipped with a communication function (hereinafter, referred to as 'IoT devices') to a network, and thereby enabling intercommunication between them.

Through an IoT technology, a user has become capable of controlling an IoT device easily without limitation on time and a place. For example, a user has become capable of controlling the power of a television (TV) by inputting a command for turning on the TV power to an electronic apparatus such as a smartphone, or controlling the power of an air conditioner by uttering a voice command such as, "Turn on the air conditioner."

Meanwhile, an IoT device may be located in various places in a home. For example, a TV may be located in the living room, and an air conditioner may be located in the bedroom.

However, depending on cases, IoT devices of the same type may be located in different places in a home. For example, TVs may be respectively located in each of the living room and the bedroom, and lights may be respectively located in each of the living room, the kitchen, the bedroom, and the bathroom.

In this case, if a user utters a voice command such as "Turn on the light in the living room," the power of the light located in the living room among the lights in a home should be controlled.

For this, an electronic apparatus controlling IoT devices should memorize information on places wherein each IoT device is located, for each IoT device.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an electronic apparatus storing information on places wherein each Internet of Things (IoT) device is located, for each IoT device, and a control method thereof.

Additional aspects will be set forth in part in the description which follows and, in part, will be apparent from the description, or may be learned by practice of the presented embodiments.

In accordance with an aspect of the disclosure, an electronic apparatus is provided. The electronic apparatus includes a communicator, a storage storing information on places wherein IoT devices are located, and a processor configured to, based on receiving a control signal for controlling an IoT device located in a specific place through the communicator, control the IoT device located in the specific place based on information on the place stored in the storage. The processor may receive motion information generated based on a motion of a user wearing a wearable device from the wearable device, identify a place corresponding to the motion information, and store the identified place as information on a place of an IoT device located within a predetermined distance from the wearable device in the storage.

Also, the storage may store information on places matched with each of a plurality of activities, and the processor may, based on the motion information, identify an activity of the user wearing the wearable device corresponding to the motion information, and based on the identified activity and the information on places matched with each of a plurality of activities, identify a place corresponding to the motion information.

In addition, the processor may, based on identifying that there are a plurality of activities corresponding to the motion information, identify an activity corresponding to the motion information among the plurality of activities based on state information of a plurality of IoT devices located in places matched with the plurality of identified activities.

Further, the processor may identify states of powers of a plurality of IoT devices located in places matched with the plurality of identified activities, identify an activity related to an IoT device of which power is in a turned-on state among the plurality of identified activities, and store a place matched with the identified activity as information on the place of the IoT device in the storage.

Also, the processor may identify states of powers of a plurality of IoT devices located in places matched with the plurality of identified activities and weights set for the plurality of IoT devices, identify an activity among the plurality of identified activities based on the states of powers and the weights, and store a place matched with the identified activity as information on the place of the IoT device in the storage.

In addition, the processor may, based on the powers of the plurality of IoT devices being in a turned-on state, store a place matched with an activity related to an IoT device having the highest weight among the plurality of IoT devices based on the weights as information on the place of the IoT device in the storage.

Further, the processor may, based on the powers of the plurality of IoT devices being in a turned-off state, or the powers of some IoT devices among the plurality of IoT devices being in a turned-on state and the powers of the remaining IoT devices being in a turned-off state, adjust the weights set for the IoT devices of which powers are in a turned-off state based on the time when the powers of the IoT devices of which powers are in a turned-off state were turned off, and store a place matched with an activity related to an IoT device having the highest weight among the plurality of IoT devices based on the weights as information on the place of the IoT device in the storage.

Also, the processor may, based on identifying that there are a plurality of activities corresponding to the motion information, identify an activity corresponding to the motion information among the plurality of activities based on sound information of IoT devices received from the wearable device.

In addition, the processor may, based on a voice command for controlling the IoT device located in the specific place being received, identify a characteristic of a voice of a user who uttered the voice command. Then, the processor may, based on identifying that a specific user uttered a voice command for controlling the IoT device located in the specific place for a number of times equal to or greater than a predetermined number of times, based on the characteristic of the voice, store the specific user by matching the user with the specific place, and based on a voice command for controlling the IoT device being received from the specific user, identify the specific place matched with the specific user among a plurality of places having the same name, and control the IoT device according to the voice command.

Further, the processor may, based on identifying that the wearable device was located in the specific place for a time period equal to or greater than a predetermined time period, store the wearable device by matching the wearable device with the specific place. Then, the processor may, based on a voice command for controlling the IoT device being received from the wearable device, identify the specific place matched with the wearable device among a plurality of places having the same name, and control the IoT device according to the voice command.

In accordance with another aspect of the disclosure, a control method of an electronic apparatus is provided. The control method includes the steps of receiving a control signal for controlling an IoT device located in a specific place and controlling the IoT device located in the specific place based on information on the place wherein the IoT device is located. Also, the control method may further include the steps of receiving motion information generated based on a motion of a user wearing a wearable device from the wearable device, identifying a place corresponding to the motion information, and storing the identified place as information on a place of an IoT device located within a predetermined distance from the wearable device.

Also, in the identifying, based on the motion information, an activity of the user wearing the wearable device corresponding to the motion information may be identified, and based on the identified activity and information on places matched with each of a plurality of activities, a place corresponding to the motion information may be identified.

In addition, in the identifying, if it is identified that there are a plurality of activities corresponding to the motion information, an activity corresponding to the motion information among the plurality of activities may be identified based on state information of a plurality of IoT devices located in places matched with the plurality of identified activities.

Meanwhile, in the storing, states of powers of a plurality of IoT devices located in places matched with the plurality of identified activities may be identified, an activity related to an IoT device of which power is in a turned-on state among the plurality of identified activities may be identified, and a place matched with the identified activity may be stored as information on the place of the IoT device.

Also, in the storing, states of powers of a plurality of IoT devices located in places matched with the plurality of identified activities and weights set for the plurality of IoT devices may be identified, an activity among the plurality of identified activities may be identified based on the states of powers and the weights, and a place matched with the identified activity may be stored as information on the place of the IoT device.

In addition, in the storing, if the powers of the plurality of IoT devices are in a turned-on state, a place matched with an activity related to an IoT device having the highest weight among the plurality of IoT devices based on the weights may be stored as information on the place of the IoT device.

Further, in the storing, if the powers of the plurality of IoT devices are in a turned-off state, or the powers of some IoT devices among the plurality of IoT devices are in a turned-on state and the powers of the remaining IoT devices are in a turned-off state, the weights set for the IoT devices of which powers are in a turned-off state may be adjusted based on the time when the powers of the IoT devices of which powers are in a turned-off state were turned off, and a place matched with an activity related to an IoT device having the highest weight among the plurality of IoT devices based on the weights may be stored as information on the place of the IoT device.

Meanwhile, in the identifying, if it is identified that there are a plurality of activities corresponding to the motion information, an activity corresponding to the motion information among the plurality of activities may be identified based on sound information of IoT devices received from the wearable device.

Also, in the controlling, based on a voice command for controlling the IoT device located in the specific place being received, a characteristic of a voice of a user who uttered the voice command may be identified. Then, if it is identified that a specific user uttered a voice command for controlling the IoT device located in the specific place for a number of times equal to or greater than a predetermined number of times, based on the characteristic of the voice, the specific user may be stored by matching the user with the specific place. In addition, based on a voice command for controlling the IoT device being received from the specific user, the specific place matched with the specific user among a plurality of places having the same name may be identified, and the IoT device may be controlled according to the voice command.

In addition, in the controlling, if it is identified that the wearable device was located in the specific place for a time period equal to or greater than a predetermined time period, the wearable device may be stored by matching the wearable device with the specific place. Also, based on a voice command for controlling the IoT device being received from the wearable device, the specific place matched with the wearable device among a plurality of places having the same name may be identified, and the IoT device may be controlled according to the voice command.

According to the various embodiments of the disclosure as described above, an electronic apparatus can be provided, which sets places wherein each IoT device is located based on motions of a user, without a need to manually input places wherein IoT devices are located.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 5 is a diagram illustrating information on places matched with each of a plurality of activities according to an embodiment of the disclosure;

FIG. 6 is a diagram illustrating information on places wherein Internet of Things (IoT) devices are located according to an embodiment of the disclosure;

FIG. 10 is a diagram illustrating a case that there are a plurality of activities corresponding to motion information according to an embodiment of the disclosure;

FIG. 11 is a diagram illustrating identifying to what degree motion information is matched with a specific activity according to an embodiment of the disclosure;

FIG. 13 is a diagram illustrating identifying an activity corresponding to motion information based on states of powers of IoT devices and weights set for the IoT devices according to an embodiment of the disclosure;

FIG. 14 is a diagram illustrating identifying an activity corresponding to motion information based on the time when the powers of IoT devices were turned off according to an embodiment of the disclosure;

FIG. 15 is a diagram illustrating identifying an activity corresponding to motion information based on the time when the powers of IoT devices were turned off according to an embodiment of the disclosure;

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Also, there are some terms that were designated by the applicant on his own. The meaning of the terms may be interpreted as defined in this specification, or may be interpreted based on the overall contents of this specification and general technical knowledge in the pertinent technical field.

In addition, in explaining the disclosure, in the case that it is determined that detailed explanation of related known functions or features may unnecessarily confuse the gist of the disclosure, the detailed explanation will be abridged or omitted.

Hereinafter, the disclosure will be described in detail with reference to the accompanying drawings.

Figure 1:
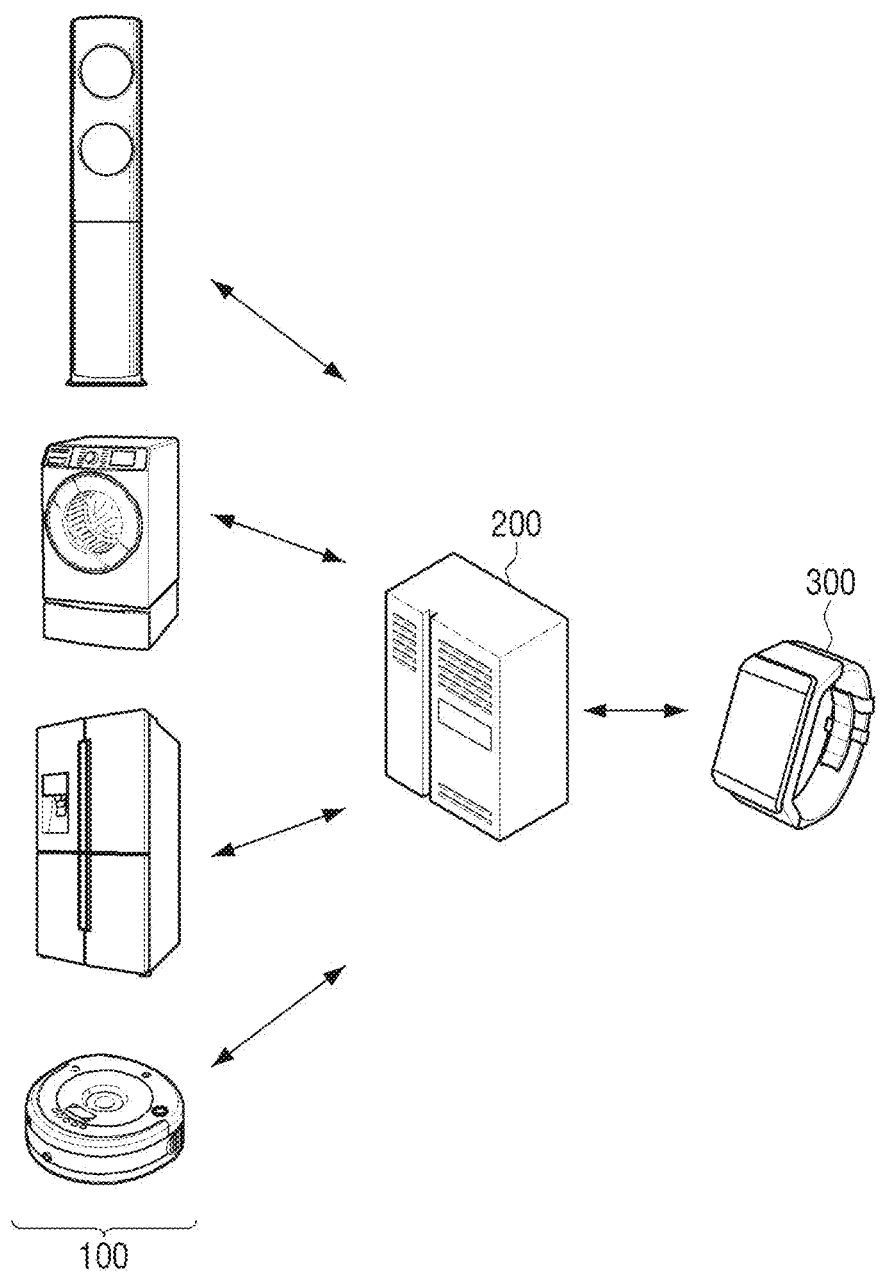
FIG. 1 is a diagram illustrating an electronic system according to an embodiment of the disclosure.

FIG. 1 is a diagram illustrating an electronic system according to an embodiment of the disclosure.

Referring to FIG. 1, an electronic system 1000 according to an embodiment of the disclosure may include at least one electronic device 100, an electronic apparatus 200, and a wearable device 300.

Here, the electronic device 100 may be an IoT device to which an Internet of Things (IoT) technology is applied. An IoT technology refers to a technology of connecting an IoT device equipped with a communication function to a network, and thereby transmitting and receiving information between a person and a thing or between a thing and a thing.

Meanwhile, hereinafter, descriptions will be made based on a case wherein the electronic device 100 is implemented as an IoT device, but it is not intended that the disclosure is necessarily applied only to IoT devices. The technical idea of the disclosure may be applied to various electronic devices equipped with a communication function.

As illustrated in FIG. 1, IoT devices that may be connected to a network based on IoT may be various electronic devices 100 such as an air conditioner, a washing machine, a refrigerator, and a robot cleaner. However, this is merely an example, and types of IoT devices are not limited to the above. As an example, IoT devices may be all things in the surroundings, such as a smartphone, a computer, a laptop computer, an air purifier, an automobile, a door locking apparatus, a game machine, and a security device.

An IoT device may constitute an IoT network with an electronic apparatus 200.

For this, an IoT device may be communicatively connected to an electronic apparatus 200. Specifically, an IoT device may be communicatively connected to an electronic apparatus 200 through wireless communication.

Also, an IoT device may be communicatively connected to an electronic apparatus 200 indirectly through an IoT hub. In this case, an IoT device may be connected to an IoT hub through a communication link such as ZigBee, Wi-Fi, and Bluetooth.

A wearable device 300 may generate motion information. Here, motion information may be generated based on a motion of a user wearing a wearable device 300.

For example, in the case that a user wearing a wearable device 300 around his wrist moved his wrist from left to right, the wearable device 300 may generate motion information including information that the wearable device 300 was moved from left to right.

For this, the wearable device 300 may include various sensors capable of detecting motions of a user such as an acceleration sensor and a gyro sensor.

Afterwards, the wearable device 300 may transmit motion information to an electronic apparatus 200. For this, the wearable device 300 may include various communication chips such as a Wi-Fi chip, a Bluetooth chip, a wireless communication chip, and a near field communication (NFC) chip.

Meanwhile, in FIG. 1, the wearable device 300 was illustrated as a form of a smart watch. However, this is merely an example, and the wearable device 300 may be implemented as various types of devices that may be worn around a user's wrist, arm, waist, or ankle, and detect motions of the user, like a form of a patch.

An electronic apparatus 200 may be communicatively connected to an IoT device, and constitute an IoT network.

Here, an electronic apparatus 200 may not only be a server, but also a specific IoT device. For example, an electronic apparatus 200 may be a smartphone, a smart TV, a computer, a laptop computer, etc.

An electronic apparatus 200 may control IoT devices through an IoT network.

For example, if a control signal for turning on the power of an air conditioner is received from a smartphone, an electronic apparatus 200 may turn on the power of the air conditioner in a turned-off state by transmitting the received control signal to the air conditioner.

Also, if a voice command such as "Turn on the air conditioner" is received, an electronic apparatus 200 may turn on the power of the air conditioner in a turned-off state by transmitting a control signal corresponding to the received voice command to the air conditioner.

In particular, an electronic apparatus 200 may control an IoT device located in a specific place through an IoT network.

For example, in a state wherein TVs are respectively located in each of the living room and the bedroom, if a control signal for turning on the power of the TV in the living room is received from a smartphone, an electronic apparatus 200 may turn on the power of the TV in the living room by transmitting the received control signal to the TV in the living room. Here, the control signal is not transmitted to the TV in the bedroom.

For this, an electronic apparatus 200 may use information on places wherein each IoT device is located.

Meanwhile, in the conventional technology, places wherein each IoT device was located were manually set, for each IoT device. For example, after an IoT management application was executed on a smartphone, places wherein each IoT device was located were manually input for each IoT device, and the places wherein each IoT device was located were thereby set.

However, in the case of setting places of IoT devices manually as in the conventional technology, there are some problems. In the case that there are numerous IoT devices, the places of all IoT devices should be set one by one, and thus a user may feel inconvenience. Also, in the case of changing the arrangement of furniture or moving into a new house while the places of all IoT devices have been set, a user should set the places of the IoT devices again, and thus inconvenience may be increased.

For overcoming such a problem, the disclosure is aimed at setting places wherein each IoT device is located, without a manual input by a user.

Specifically, the disclosure is aimed at setting places wherein each IoT device is located by using motion information received from a wearable device 300. Hereinafter, this will be described in more detail with reference to the accompanying drawings.

Figure 2:
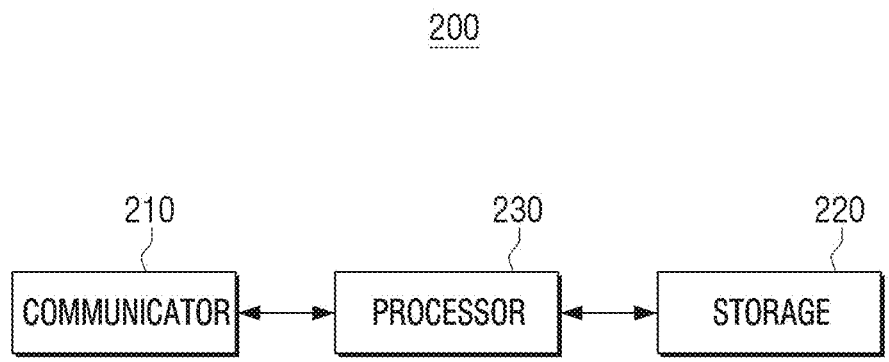
FIG. 2 is a block diagram illustrating an electronic apparatus according to an embodiment of the disclosure.

FIG. 2 is a block diagram illustrating an electronic apparatus according to an embodiment of the disclosure.

Referring to FIG. 2, an electronic apparatus 200 according to an embodiment of the disclosure may include a communicator 210, a storage 220, and a processor 230.

The communicator 210 may perform communication with IoT devices and transmit and receive various data.

Specifically, the communicator 210 may receive a control signal for controlling another IoT device from an IoT device, and transmit the received control signal to the aforementioned another IoT device. For example, the communicator 210 may receive a control signal for turning on the power of an air conditioner from a smartphone, and transmit the received control signal to the air conditioner.

Also, the communicator 210 may receive a voice command for controlling another IoT device from an IoT device, and transmit a control signal corresponding to the received voice command to the aforementioned another IoT device. For example, the communicator 210 may receive a voice command such as "Turn on the air conditioner" from a smartphone, and transmit a control signal corresponding to the received voice command to the air conditioner.

In addition, the communicator 210 may receive state information of an IoT device from the IoT device, and transmit the received state information to another IoT device. Here, state information may be information on the surrounding environment detected by the IoT device or the state of the power of the IoT device itself. For example, the communicator 210 may receive information on the current humidity in the surrounding environment from an air conditioner, and transmit the received information on the current humidity in the surrounding environment to the smartphone.

Meanwhile, the aforementioned embodiment is just an example, and the communicator 210 may transmit and receive various data related to IoT services to and from an IoT device.

For this, the communicator 210 may be connected with an IoT device through wireless communication. For example, the communicator 210 may be connected with an IoT device by using various wireless communication technologies such as 5th generation mobile communications (5G), long-term evolution (LTE), LTE Advance (LTE-A), code division multiple access (CDMA), wideband CDMA (WCDMA), a universal mobile telecommunications system (UMTS), Wireless Broadband (WiBro), and a Global System for Mobile Communications (GSM).

Meanwhile, wireless communication may include near field communication. For example, the communicator 210 may be connected with an IoT device by using near field communication technologies such as Wi-Fi direct, Bluetooth, near field communication (NFC), and ZigBee.

For this, the communicator 210 may include a Wi-Fi module, a Bluetooth module, a wireless communication chip, etc.

Meanwhile, the communicator 210 may also be connected with an IoT device through wired communication. For example, the communicator 210 may be connected with an IoT device by using wired communication technologies such as a universal serial bus (USB), a high definition multimedia interface (HDMI), a recommended standard 232 (RS-232), and a plain old telephone service (POTS).

The storage 220 may store various programs and data necessary for an operation of the electronic apparatus 200.

In particular, the storage 220 may store information on places wherein IoT devices are located. Specifically, the storage 220 may match a specific place for each IoT device, and store the place.

For example, the storage 220 may store information on places wherein IoT devices are located, such as a TV to which the living room is matched, a microwave oven to which the kitchen is matched, and a light to which the bathroom is matched.

Also, the storage 220 may store information on places matched with each of a plurality of activities.

Here, places matched with each of a plurality of activities may vary according to the characteristic of each activity. Specifically, places matched with each of a plurality of activities may be representative places wherein the corresponding activities mainly occur.

For example, the storage 220 may store information on places matched with activities, such as a TV watching activity to which the living room is matched, a dining activity to which the kitchen is matched, and a shower activity to which the bathroom is matched.

Meanwhile, the storage 220 may be implemented as various storage media such as a hard disk, a non-volatile memory, and a volatile memory.

The processor 230 controls the overall operations of the electronic apparatus 200. For this, the processor 230 may include one or more of a central processing unit (CPU), an application processor (AP), or a communication processor (CP).

Also, the processor 230 may control IoT devices.

Specifically, in the case that a control signal for controlling an IoT device is received through the communicator 210, the processor 230 may control the IoT device by transmitting the received control signal to the IoT device.

Here, control signals may be received from various IoT devices.

For example, in the case that a user command for controlling a specific IoT device is input through an IoT management application installed on a smartphone, the processor 230 may receive a control signal for controlling the specific IoT device from the smartphone. Then, the processor 230 may control the specific IoT device by transmitting the received control signal to the IoT device.

Also, in the case that a voice command for controlling a specific IoT device is input to an IoT device equipped with a microphone, the processor 230 may receive the voice command from the IoT device equipped with a microphone. Then, the processor 230 may control the specific IoT device by transmitting a control signal corresponding to the received voice command to the IoT device.

Meanwhile, the processor 230 may receive state information of an IoT device from the IoT device, and transmit the received state information to another IoT device. Here, state information may be information on the surrounding environment detected by the IoT device or the state of the power of the IoT device itself.

For example, the processor 230 may receive information on the current humidity in the surrounding environment from an air conditioner, and transmit the received information on the current humidity in the surrounding environment to the smartphone.

The processor 230 may control an IoT device located in a specific place. Specifically, in the case that a control signal for controlling an IoT device located in a specific place is received through the communicator 210, the processor 230 may control the IoT device located in the specific place by transmitting the received control signal to the aforementioned IoT device located in the specific place.

Here, the processor 230 may use information on places stored in the storage 220. Here, information on places is information on places wherein each IoT device is located, and means information wherein a specific place is matched with each IoT device and is stored.

For example, information on places stored in the storage 220 may include a TV to which the living room is matched, a microwave oven to which the kitchen is matched, a light to which the bathroom is matched, etc.

Accordingly, in the case that a voice command such as "Turn on the light in the bathroom" is received, the processor 230 may identify the light in the bathroom among the lights in a home based on the stored information on places, and transmit a signal for controlling the power of a light to the light in the bathroom, and thereby control the power of the light in the bathroom.

Meanwhile, information on places as described above may be stored based on motion information received from a wearable device 300.

For this, the processor 230 may receive motion information from a wearable device 300. Here, motion information may be generated based on a motion of a user wearing a wearable device 300.

Figure 3:
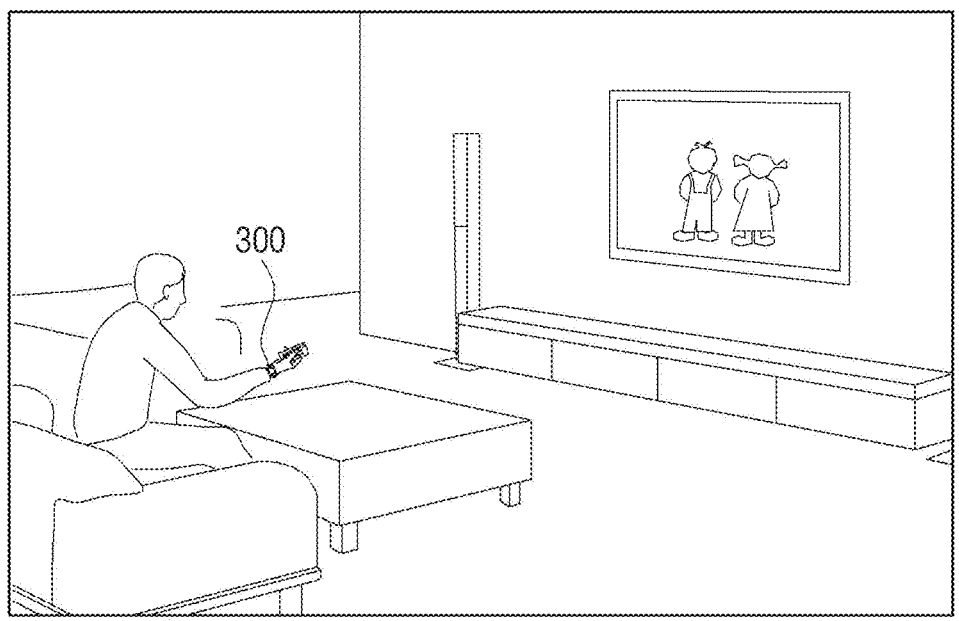
FIG. 3 is a diagram illustrating motion information according to an embodiment of the disclosure.

FIG. 3 is a diagram illustrating motion information according to an embodiment of the disclosure.

Referring to FIG. 3, in the case that a user wearing a wearable device 300 around his wrist picked up a remote controller and put it down, the processor 230 may receive motion information including information that the wearable device 300 was moved from up to down from the wearable device 300.

Figure 4:
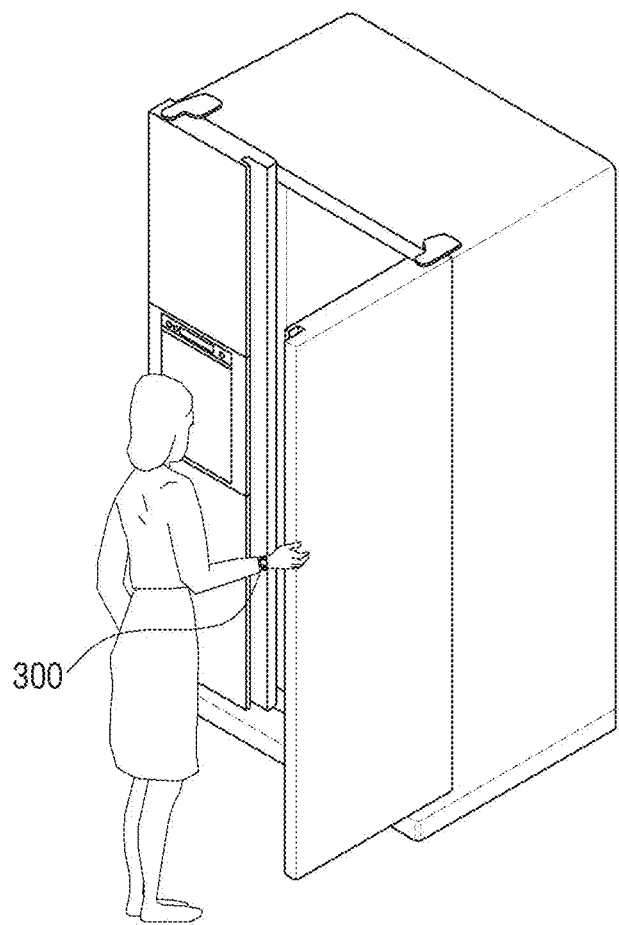
FIG. 4 is a diagram illustrating motion information according to an embodiment of the disclosure.

FIG. 4 is a diagram illustrating motion information according to an embodiment of the disclosure.

Referring to FIG. 4, in the case that a user wearing a wearable device 300 around his wrist opened the door of a refrigerator, the processor 230 may receive motion information including information that the wearable device 300 was moved from front to back from the wearable device 300.

Then, the processor 230 may identify an activity corresponding to the received motion information.

Specifically, the processor 230 may identify an activity corresponding to the motion information through machine learning. Here, machine learning is a field of artificial intelligence technologies, and is a technology of learning by itself through data provided from the outside, and predicting an output value for an input value. For this, the electronic apparatus 200 according to an embodiment of the disclosure may make activities related to various types of motion information as big data, and store the data.

For example, in the case that motion information that a wearable device 300 was moved from up to down is received from the wearable device 300, the processor 230 may identify that the user picked up a remote controller and put it down through machine learning, and identify that the activity of the user wearing the wearable device 300 is a TV watching activity.

Also, in the case that motion information that a wearable device 300 was moved back and forth repeatedly is received from the wearable device 300, the processor 230 may identify that a user is washing hands through machine learning, and identify that the activity of the user wearing the wearable device 300 is a washing activity.

Meanwhile, the aforementioned embodiment is just an example, and the electronic apparatus 200 according to an embodiment of the disclosure may identify various activities such as a dining activity and a sound sleep activity through machine learning. However, machine learning is just an example, and the electronic apparatus 200 according to an embodiment of the disclosure may identify activities corresponding to motion information by using various artificial intelligence technologies such as deep learning. That is, it is intended that the technical idea of the disclosure is not necessarily limited to machine learning.

Afterwards, the processor 230 may identify a place corresponding to motion information based on an activity of a user.

For this, the processor 230 may use information on places matched with each of a plurality of activities stored in the storage 220. Hereinafter, description in this regard will be made with reference to FIG. 5.

FIG. 5 is a diagram illustrating information on places matched with each of a plurality of activities according to an embodiment of the disclosure.

The electronic apparatus 200 may store information on places matched with each of a plurality of activities. Specifically, the electronic apparatus 200 may match a specific place for each activity, and store the place.

For example, referring to FIG. 5, the electronic apparatus 200 may store information on places matched with activities, such as a TV watching activity to which the living room is matched, a dining activity to which the kitchen is matched, and a washing activity to which the bathroom is matched.

Then, the processor 230 may identify a place corresponding to the motion information of the user, based on information on places matched with each of a plurality of activities.

As in the aforementioned embodiment, in the case that it is identified that an activity corresponding to motion information is a TV watching activity, the processor 230 may identify the living room which is a place matched with the TV watching activity as a place corresponding to motion information.

Likewise, if it is identified that an activity corresponding to motion information is a dining activity, the processor 230 may identify the kitchen which is a place matched with the dining activity as a place corresponding to motion information.

Afterwards, the processor 230 may store the identified place as information on the place of an IoT device.

Specifically, the processor 230 may receive location information from each of a wearable device 300 and an IoT device, and if it is identified that the IoT device is within a predetermined distance from the wearable device 300, the processor 230 may store information on a place identified from motion information as information on the place of the IoT device.

For example, if it is identified that a place corresponding to motion information is the living room, and that a TV is located within a radius of 1m from the wearable device 300, the processor 230 may match the living room with the TV, and store the place.

Through a method as described above, the processor 230 may match a place for each IoT device, and store the place.

FIG. 6 is a diagram illustrating information on places wherein IoT devices are located according to an embodiment of the disclosure.

Referring to FIG. 6, the processor 230 may match the living room with a TV, match the bedroom with a lamp, match the bathroom with a faucet, and match the kitchen with a microwave oven.

Accordingly, in the case that a voice command such as "Turn on the TV in the living room" is received from a user, the processor 230 may identify a TV in the living room among a plurality of TVs located in a home, and control the power of the TV in the living room.

Meanwhile, to a method of identifying whether an IoT device is within a predetermined distance from a wearable device 300, various technologies may be applied.

For example, each of a wearable device 300 and an IoT device may receive a global positioning system (GPS) signal including information on locations from a satellite by using a GPS chip, and transmit the received GPS signal to the electronic apparatus 200. Accordingly, the processor 230 may identify the IoT device within a predetermined distance from the wearable device 300 by using the information on locations received from each of the wearable device 300 and the IoT device, and match the information on places identified from motion information with the IoT device and store the information.

Alternatively, the processor 230 may identify whether an IoT device is within a predetermined distance from a wearable device 300 by using a beacon which is a near field wireless communication device based on a Bluetooth protocol.

Also, the processor 230 may identify whether an IoT device is within a predetermined distance from a wearable device 300 based on an NFC tag installed on the IoT device being tagged to the wearable device 300.

In addition, the processor 230 may identify whether an IoT device is within a predetermined distance from a wearable device 300 based on the signal strength between the wearable device 300 and the IoT device.

Specifically, the processor 230 may receive information on the signal strength between a wearable device 300 and an IoT device from at least one of the wearable device 300 or the IoT device, and if the received signal strength is equal to or greater than a predetermined threshold, the processor 230 may identify that the IoT device is within a predetermined distance from the wearable device 300.

Meanwhile, in identifying whether an IoT device is within a predetermined distance from a wearable device 300, the processor 230 may identify based on a zone wherein the wearable device 300 is located.

Hereinafter, description will be made with reference to FIGS. 7 and 8.

Figure 7:
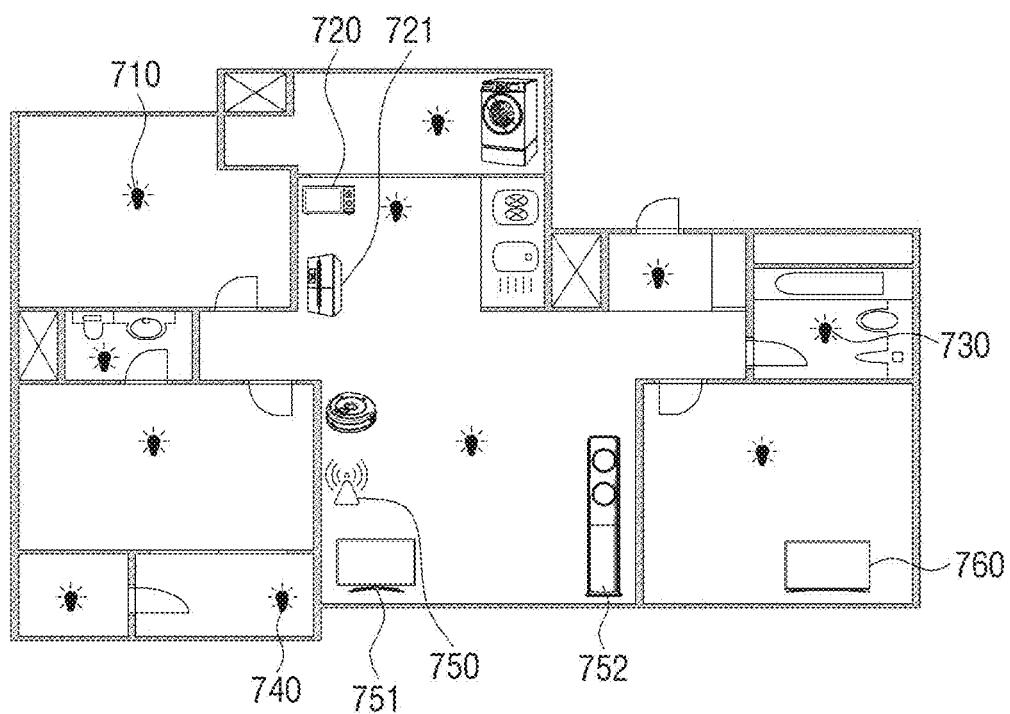
FIG. 7 is a diagram illustrating matching information on places with IoT devices according to an embodiment of the disclosure.
Figure 8:
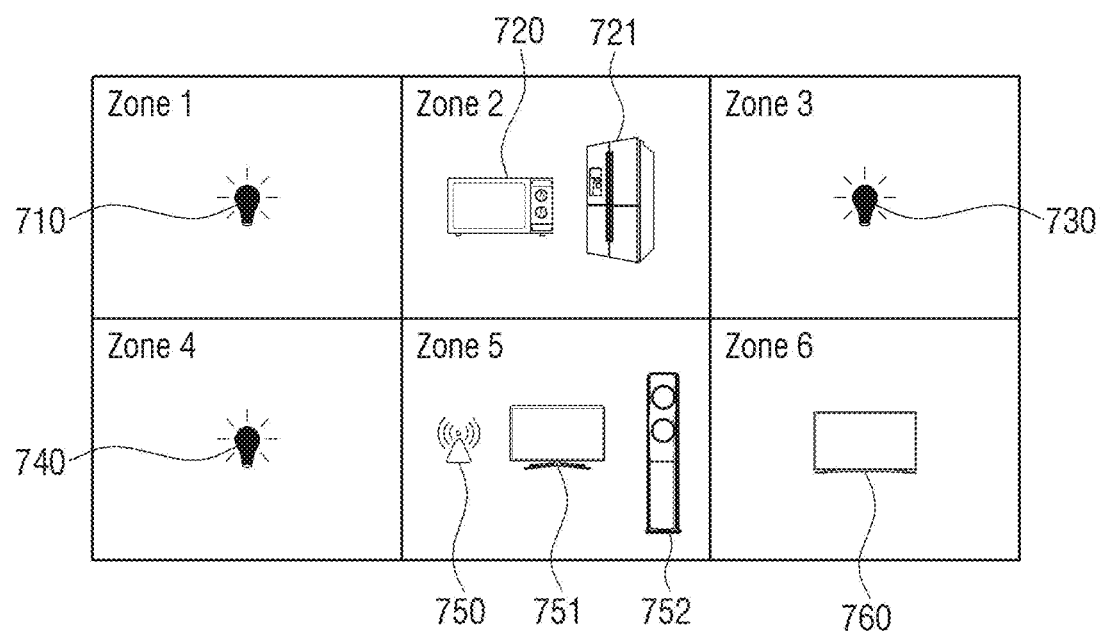
FIG. 8 is a diagram illustrating matching information on places with IoT devices according to an embodiment of the disclosure.

FIGS. 7 and 8 are diagrams illustrating of matching information on places with IoT devices according to various embodiments of the disclosure.

Hereinafter, for the convenience of explanation, description will be made based on an example wherein a place corresponding to motion information was identified as the living room.

Referring to FIG. 7, a plurality of IoT devices in a home may be respectively located in various places such as the bedroom, the living room, and the bathroom.

In this case, the processor 230 may identify zones wherein each IoT device is located based on the signal strength between an AP and an IoT device, and the signal strength between IoT devices.

Specifically, referring to FIG. 7, the processor 230 may receive the signal strength between an AP and an IoT device from at least one of the AP 750 or the IoT device. Then, the processor 230 may identify the degree of distance of each IoT device from the AP 750 based on the received signal strength.

For example, if the signal strength between an AP and an IoT device is strong, the processor 230 may identify that the IoT device is located relatively close to the AP. In contrast, if the signal strength between an AP and an IoT device is weak, the processor 230 may identify that the IoT device is located relatively far from the AP.

Also, the processor 230 may receive the signal strength between IoT devices from at least one IoT device. Then, the processor 230 may identify the degree of distance between IoT devices based on the received signal strength.

For example, if the signal strength between IoT devices is strong, the processor 230 may identify that the IoT devices are located close to each other. In contrast, if the signal strength between IoT devices is weak, the processor 230 may identify that the IoT devices are located relatively far from each other.

Meanwhile, to a technology of identifying the degree of relative distance between IoT devices based on the signal strength, various technical ideas may be applied. For example, the processor 230 may identify the degree of relative distance between IoT devices by using a Tanimoto Coefficient algorithm.

Afterwards, the processor 230 may identify zones wherein each IoT device is located based on the degree of distance between an AP and an IoT device and the degree of distance between IoT devices.

Referring to FIG. 8, the processor 230 may identify that lights 710, 730, 740 are respectively located in a first zone, a third zone, and a fourth zone, a microwave oven 720 and a refrigerator 721 are located in a second zone, an AP 750, a first TV 751, and an air conditioner 752 are located in a fifth zone, and a second TV 760 is located in a sixth zone.

Then, the processor 230 may identify a zone wherein a wearable device 300 is located based on location information of the wearable device 300 received from the wearable device 300. Here, location information of the wearable device 300 may be included in a GPS signal and a beacon signal as described above, and also, the location information may be at least one of information on the signal strength between an AP and the wearable device 300 and information on the signal strength between the wearable device 300 and an IoT device.

For example, if the signal strength between an AP and the wearable device 300 is strong, the processor 230 may identify that the wearable device 300 is located relatively close to the AP. In contrast, if the signal strength between the wearable device 300 and an AP is weak, the processor 230 may identify that the wearable device 300 is located relatively far from the AP.

Also, if the signal strength between the wearable device 300 and an IoT device is strong, the processor 230 may identify that the wearable device 300 is located relatively close to the IoT device. In contrast, if the signal strength between the wearable device 300 and an IoT device is weak, the processor 230 may identify that the wearable device 300 is located relatively far from the IoT device.

In addition, the processor 230 may identify an IoT device located in the same zone as the zone wherein the wearable device 300 is located as an IoT device within a predetermined distance from the wearable device 300.

For example, if it is identified that the wearable device 300 is located in the fifth zone, the processor 230 may identify an IoT device located in the fifth zone as an IoT device within a predetermined distance from the wearable device 300.

Further, the processor 230 may store a place identified to correspond to motion information as information on the place of the IoT device located in the same zone as the wearable device 300.

In the aforementioned embodiment, the processor 230 may identify the fifth zone as the living room, and match the living room with the AP 750, the first TV 751, and the air conditioner 752 located in the fifth zone, and store the place.

As described above, by dividing a place into a plurality of zones, and matching information on places with each IoT device based on the zones wherein the IoT devices are located, the place of each IoT device can be set more precisely.

Also, in that case that a new IoT device is added to a specific zone, the processor 230 may match information on places with the new IoT device only by identifying the zone wherein the IoT device is located, and store the place of the new IoT device.

That is, in the aforementioned embodiment, in the case that a new IoT device is added to the fifth zone identified to be the living room, the processor 230 may match the living room with the new IoT device as the device is located in the fifth zone, and store the place.

Accordingly, in the case that a control signal for controlling an IoT device located in a specific place is received, the processor 230 may control the IoT device located in the specific place.

Figure 9:
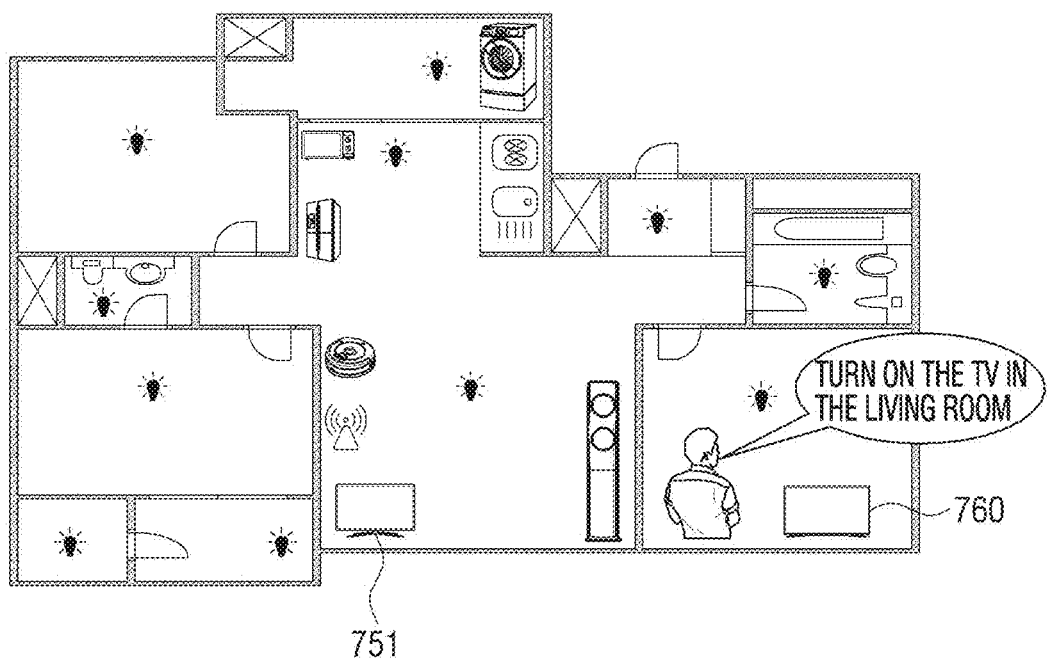
FIG. 9 is a diagram illustrating an embodiment of controlling an IoT device located in a specific place according to an embodiment of the disclosure.

FIG. 9 is a diagram illustrating controlling an IoT device located in a specific place according to an embodiment of the disclosure.

Referring to FIG. 9, in the case that a user located in the bedroom uttered a voice command such as "Turn on the TV in the living room," the processor 230 may identify a TV 751 to which the living room is matched, and transmit a signal controlling the power to the TV 751 to which the living room is matched.

FIG. 10 is a diagram illustrating a case that there are a plurality of activities corresponding to motion information according to an embodiment of the disclosure.

Depending on cases, the processor 230 may identify that there are a plurality of activities corresponding to motion information.

For example, in the case that motion information that a wearable device 300 moved from up to down is received from the wearable device 300, the processor 230 may identify that the user picked up a remote controller and put it down through machine learning, or identify that the user picked up a spoon and put it down.

In this case, the processor 230 may first identify to what degree motion information is matched with a specific activity through machine learning.

Referring to FIG. 10, the processor 230 may identify through machine learning that the received motion information is matched with a TV watching activity by 70%, matched with a sleeping activity by 3%, matched with a washing activity by 10%, and matched with a dining activity by 40%.

Then, the processor 230 may identify an activity having a matching probability equal to or greater than a predetermined matching probability as an activity corresponding to the received motion information.

Here, a predetermined matching probability may be set in various ways according to a user command. For example, a predetermined matching probability may be set as 60%.

In the case that a predetermined matching probability is set as 60%, as described above, the processor 230 may identify that an activity corresponding to motion information is a TV watching activity in the aforementioned embodiment.

FIG. 10 is a diagram illustrating the case that it is identified that there are a plurality of activities having a matching probability equal to or greater than a predetermined matching probability.

In the case that it is identified that there are a plurality of activities corresponding to motion information, as described above, the processor 230 may identify to what degree motion information is matched with a specific activity.

Then, the processor 230 may identify an activity having a matching probability equal to or greater than a predetermined matching probability as an activity corresponding to the received motion information.

Meanwhile, depending on cases, the processor 230 may identify that there are a plurality of activities having a matching probability equal to or greater than a predetermined matching probability.

FIG. 11 is a diagram illustrating identifying to what degree motion information is matched with a specific activity according to an embodiment of the disclosure.

Referring to FIG. 11, in the case that motion information that a wearable device 300 was moved from up to down is received from the wearable device 300, the processor 230 may identify that the received motion information is matched with a TV watching activity by 70%, matched with a sleeping activity by 3%, matched with a washing activity by 10%, and matched with a dining activity by 65%.

Here, in the case that a predetermined matching probability is 60%, the processor 230 may identify a TV watching activity and a dining activity having a matching probability equal to or greater than a predetermined matching probability as activities corresponding to motion information.

In this case, the processor 230 may identify an activity corresponding to motion information among a plurality of activities based on state information of IoT devices.

Specifically, the processor 230 may identify an activity corresponding to motion information among a plurality of activities based on state information of IoT devices located in places matched with each of a plurality of activities.

Hereinafter, description will be made with reference to FIGS. 12 to 15.

Meanwhile, hereinafter, it will be described that, in the case that it is identified that there are a plurality of activities having a matching probability equal to or greater than a predetermined matching probability, an activity corresponding to motion information is identified in consideration of state information of IoT devices. However, it is not intended that state information of IoT devices is considered necessarily in a case wherein it is identified that there are a plurality of activities having a matching probability equal to or greater than a predetermined matching probability. That is, in the disclosure, in the case that it is identified that there are a plurality of activities corresponding to motion information, regardless of a predetermined matching probability, an activity corresponding to motion information may be identified in consideration of state information of IoT devices.

Figure 12:
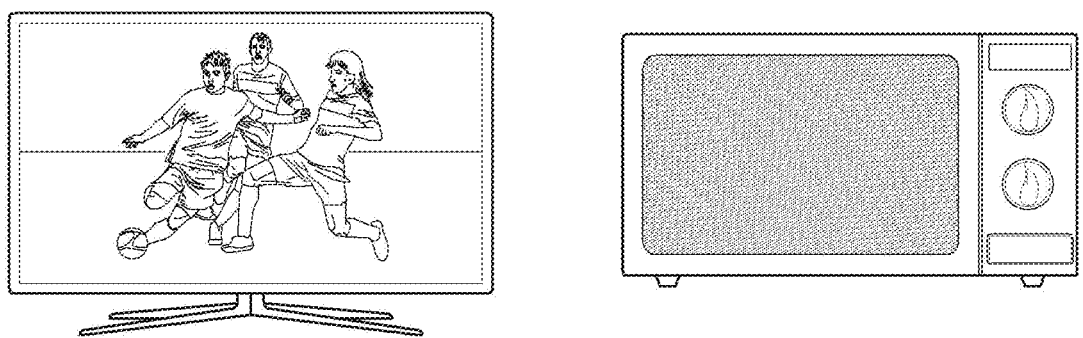
FIG. 12 is a diagram illustrating identifying an activity corresponding to motion information based on state information of IoT devices according to an embodiment of the disclosure.

FIG. 12 is a diagram illustrating identifying an activity corresponding to motion information based on state information of IoT devices according to an embodiment of the disclosure.

If it is identified that there are a plurality of activities having a matching probability equal to or greater than a predetermined matching probability, the processor 230 may identify an activity corresponding to motion information among the plurality of activities based on state information of IoT devices located in places matched with each of the plurality of activities.

Here, IoT devices located in places matched with each of a plurality of activities may have been set in advance. For example, referring to FIG. 5 again, a place matched with a TV watching activity is the living room, and the IoT device located in a place matched with a TV watching activity may have been set as a TV in advance. Also, a place matched with a dining activity is the kitchen, and the IoT device located in a place matched with a dining activity may have been set as a microwave oven in advance.

Meanwhile, state information of IoT devices may be states of powers of IoT devices.

That is, if it is identified that there are a plurality of activities having a matching probability equal to or greater than a predetermined matching probability, the processor 230 may identify the states of powers of IoT devices located in places matched with each of the plurality of activities.

For example, in the case that a TV watching activity and a dining activity are identified as activities having a matching probability equal to or greater than a predetermined matching probability, the processor 230 may identify the state of the power of each of the TV and the microwave oven.

For this, the processor 230 may receive information on the state of the power from each of the TV and the microwave oven.

Then, the processor 230 may identify an activity related to an IoT device of which power is in a turned-on state among a plurality of activities.

Referring to FIG. 12, in the case that the power of the TV is in a turned-on state, and the power of the microwave oven is in a turned-off state, the processor 230 may identify an activity related to the TV of which power is in a turned-on state (i.e., identify a TV watching activity).

Then, the processor 230 may store a place matched with the identified activity as information on the place of the IoT device in the storage 220.

That is, in the aforementioned embodiment, the processor 230 may identify the living room which is a place matched with a TV watching activity, and match the living room with an IoT device within a predetermined distance from a wearable device 300, and store the place.

This reflects that an activity of a user is highly likely to be an activity related to an IoT device of which power is in a turned-on state, and accordingly, an activity corresponding to motion information can be identified more precisely.

FIG. 13 is a diagram illustrating identifying an activity corresponding to motion information based on states of powers of IoT devices and weights set for the IoT devices according to an embodiment of the disclosure.

The processor 230 may identify an activity corresponding to motion information among a plurality of activities in further consideration of states of powers of IoT devices and weights set for the IoT devices.

Referring to FIG. 13, the electronic apparatus 200 according to an embodiment of the disclosure may store a table wherein different weights are set for each IoT device. For example, the electronic apparatus 200 may store a table wherein a weight of 30% is set for a TV, and a weight of 50% is set for a microwave oven (range).

Meanwhile, the processor 230 may identify an activity corresponding to motion information among a plurality of activities based on states of powers of IoT devices and weights set for the IoT devices.

Specifically, if it is identified that there are a plurality of activities having a matching probability equal to or greater than a predetermined matching probability, the processor 230 may identify the states of powers of IoT devices located in places matched with each of the plurality of activities. Then, if it is identified that the powers of all the IoT devices are in a turned-on state, the processor 230 may identify an activity related to an IoT device having a high weight among the plurality of activities as an activity corresponding to motion information.

For example, in the case that activities having a matching probability equal to or greater than a predetermined matching probability are a TV watching activity and a dining activity, the processor 230 may identify the state of the power of each of the TV and the microwave oven.

Then, as illustrated in FIG. 13, in the case that the powers of both the TV and the microwave oven are in a turned-on state, the processor 230 may identify an activity related to a microwave oven having a high weight (e.g., a dining activity) as an activity corresponding to motion information.

In addition, the processor 230 may store a place matched with the identified activity as information on the place of the IoT device in the storage 220.

That is, in the aforementioned embodiment, the processor 230 may identify the kitchen which is a place matched with a dining activity, and match the kitchen with an IoT device within a predetermined distance from a wearable device 300, and store the place.

Meanwhile, the aforementioned weight may be set in advance according to a user command.

Also, weights may be set for each IoT device by the processor 230. Specifically, the processor 230 may set a higher weight for an IoT device used for a relatively short time period than for an IoT device used for a long time period.

For this, the processor 230 may receive logging data from an IoT device. Here, logging data may include the log-on time (i.e., the time when the power was turned on) and the log-off time (i.e., the time when the power was turned off) of an IoT device.

Specifically, the processor 230 may identify the usage time for each IoT device based on the log-on time and the log-off time included in logging data, and set a higher weight for an IoT device used for a relatively short time period than for an IoT device used for a long time period.

For example, based on logging data, the processor 230 may set a higher weight for a microwave oven used for a short time period during a cooking process than for a weight for a TV used for a relatively long time period.

This reflects that in the case that both an IoT device used for a short time period and an IoT device used for a long time period are in a turned-on state, a user is highly likely to have taken a specific motion near an IoT device used for a short time period.

Accordingly, an activity corresponding to motion information can be identified more precisely.

Meanwhile, in the aforementioned embodiment, it was described that an activity related to an IoT device having a high weight is identified as an activity corresponding to motion information. However, the processor 230 may identify an activity corresponding to motion information based on a value of summing up a matching probability and a weight.

Referring to FIG. 13, the processor 230 may compare a summed-up value of 100%) in the case that motion information received from a wearable device 300 is matched with a TV watching activity by 70%, and a weight set for the TV is 30%, with a summed-up value of 115% in the case that motion information received from a wearable device 300 is matched with a dining activity by 65%, and a weight set for the microwave oven is 50%, and identify an activity related to an IoT device having a relatively bigger value as an activity corresponding to motion information.

That is, in the aforementioned embodiment, as a value of summing up a matching probability to a dining activity and a weight set for the microwave oven is bigger than a value of summing up a matching probability to a TV watching activity and a weight set for the TV, the processor 230 may identify a dining activity which is an activity related to the microwave oven as an activity corresponding to motion information.

FIGS. 14 and 15 are diagrams illustrating identifying an activity corresponding to motion information based on the time when the powers of IoT devices were turned off according to an embodiment of the disclosure.

As described above, in the case that it is identified that there are a plurality of activities having a matching probability equal to or greater than a predetermined matching probability, the processor 230 may identify the states of powers of IoT devices located in places matched with each of the plurality of activities.

For example, in the case that activities having a matching probability equal to or greater than a predetermined matching probability are a TV watching activity and a dining activity, the processor 230 may identify the state of the power of each of the TV and the microwave oven.

Also, in the case that there is an IoT device in a turned-off state, the processor 230 may identify the time when the IoT device was turned off.

Specifically, the processor 230 may identify the time when the IoT device was turned off based on logging data received from the IoT device.

FIG. 14 is a diagram illustrating identifying an activity corresponding to motion information based on the time when the powers of IoT devices were turned off according to an embodiment of the disclosure.

Referring to FIG. 14, in the case that the state of the power of a microwave oven is in a turned-off state, the processor 230 may identify that the microwave oven was turned off at 18:35 on July 12 (07121835), based on logging data received from the microwave oven.

In this case, the processor 230 may adjust a weight based on the time when the power of an IoT device was turned off.

Specifically, if it is identified that the power of an IoT device was turned off within a predetermined time period from the current time, the processor 230 may apply a weight as it is, and if it is identified that the power of an IoT device was turned off before a predetermined time period from the current time, the processor 230 may adjust a weight to be lower.

Here, a predetermined time period may be set according to a user command. Hereinafter, for the convenience of explanation, description will be made based on the assumption that a predetermined time was set as 10 minutes.

For example, as illustrated in FIG. 14, if the current time and date are 18:40 on July 12 (07121840), and it is identified that the microwave oven was turned off at 18:35 on July 12 (07121835), as the microwave oven was turned off within a predetermined time period from the current time, the processor 230 may apply the set weight 50%.

Accordingly, the processor 230 may identify an activity related to the microwave oven having a high weight (i.e., a dining activity) as an activity corresponding to motion information.

This reflects that, even if the power of a specific IoT device is in a turned-off state, if the power was turned off within a predetermined time period, a user is highly likely to have taken a motion near the specific IoT device.

Accordingly, an activity corresponding to motion information can be identified more precisely.

FIG. 15 is a diagram illustrating identifying an activity corresponding to motion information based on the time when the powers of IoT devices were turned off according to an embodiment of the disclosure.

Referring to FIG. 15, if it is identified that the current time and date are 21:30 on July 12 (07122130), and a microwave oven was turned off at 18:35 on July 11 (07111835), as the microwave oven was turned off before a predetermined time period from the current time, the processor 230 may set the set weight to be lower than 50%. For example, if it is identified that the microwave oven was turned off for 24 hours or more, the processor 230 may adjust the weight of the microwave oven to 0%.

Accordingly, the processor 230 may identify an activity related to the TV having a high weight (i.e., a TV watching activity), between the TV and the microwave oven, as an activity corresponding to motion information.

Then, the processor 230 may store a place matched with the identified activity as information on the place of the IoT device in the storage 220.

That is, in the aforementioned embodiment, the processor 230 may identify the living room which is a place matched with a TV watching activity, and match the living room with an IoT device within a predetermined distance from a wearable device 300, and store the place.

By adjusting a weight based on the time when an IoT device was turned off as described above, an activity corresponding to motion information can be identified more precisely.

Meanwhile, here, description was made based on an embodiment wherein the powers of some IoT devices among a plurality of IoT devices are in a turned-on state, and the powers of the remaining IoT devices are in a turned-off state. However, the aforementioned technical idea can be applied even when the powers of all of a plurality of IoT devices are in a turned-off state.

For example, in the case that a TV was turned off within a predetermined time period, and a microwave oven was turned off before a predetermined time period, the processor 230 may adjust a weight for the microwave oven to be low, and identify a TV watching activity as an activity corresponding to motion information. Meanwhile, in the case that a TV was turned off before a predetermined time period, and a microwave oven was turned off within a predetermined time period, the processor 230 may adjust a weight for the TV to be low, and identify a dining activity as an activity corresponding to motion information. Also, in the case that both a TV and a microwave oven were turned off within a predetermined time period, the processor 230 may apply set weights as they are without adjusting the weights, and identify a dining activity as an activity corresponding to motion information.

Figure 16:
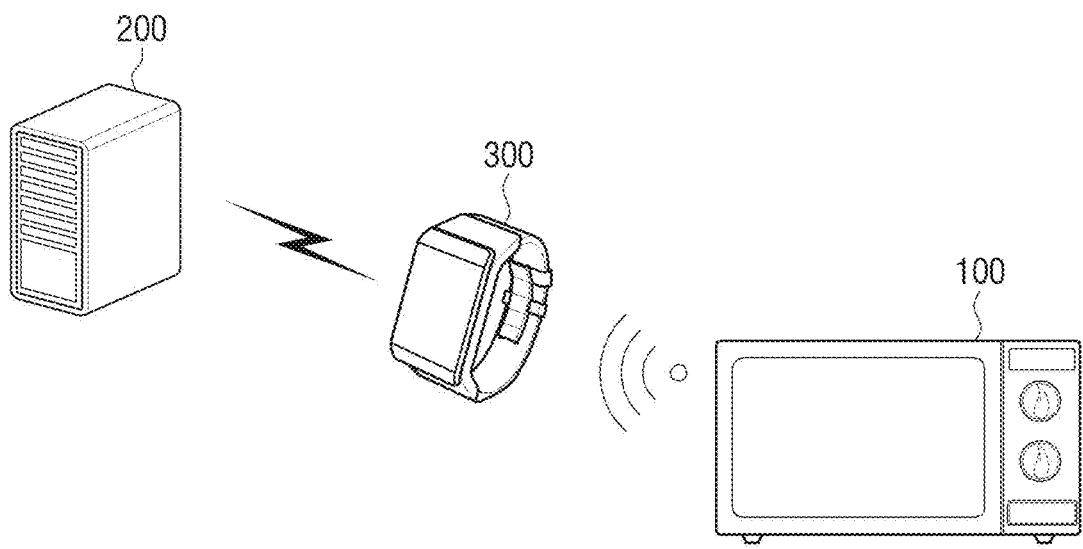
FIG. 16 is a diagram illustrating identifying an activity corresponding to motion information based on sound information of IoT devices according to an embodiment of the disclosure.

FIG. 16 is a diagram illustrating identifying an activity corresponding to motion information based on sound information of IoT devices according to an embodiment of the disclosure.

As described above, the processor 230 may identify a plurality of activities corresponding to motion information.

In this case, the processor 230 may identify an activity corresponding to motion information among a plurality of activities based on sound information of IoT devices.

Specifically, if it is identified that there are a plurality of activities corresponding to motion information, the processor 230 may transmit a signal requesting sound information to a wearable device 300. Then, when sound information is received from the wearable device 300, the processor 230 may identify an IoT device corresponding to the received sound information.

For this, the electronic apparatus 200 according to an embodiment of the disclosure may store sound data output for each IoT device. Here, sound data may be intrinsic sound data generated from a product.

For example, in the case that sound information received from a wearable device 300 corresponds to sound data generated from a microwave oven, the processor 230 may identify the microwave oven as an IoT device corresponding to the received sound information.

Then, the processor 230 may identify an activity related to the microwave oven (e.g., a dining activity) as an activity corresponding to motion information.

Figure 17:
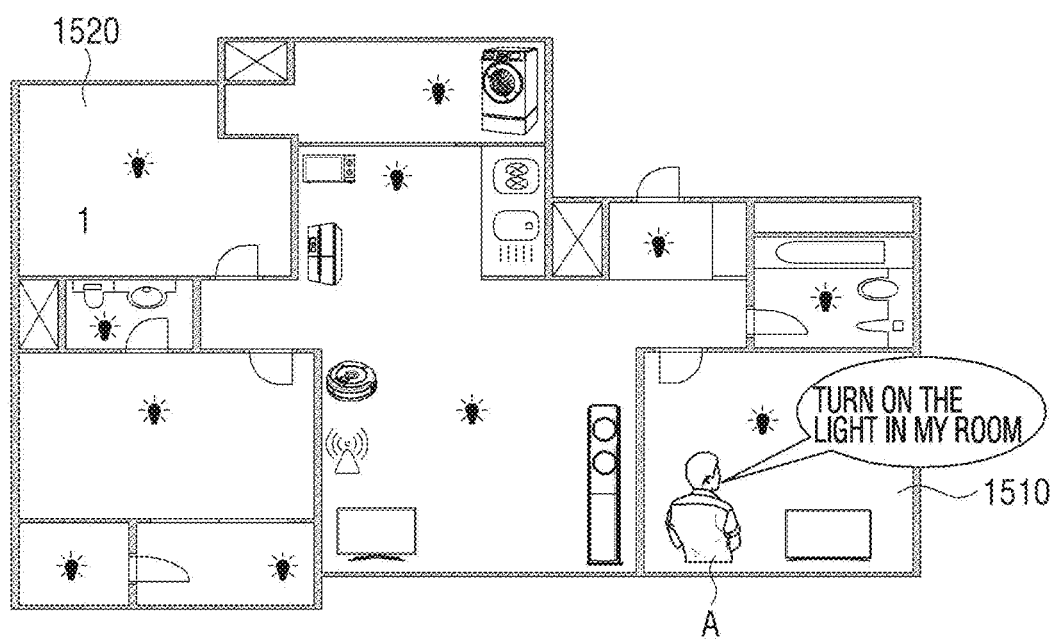
FIG. 17 is a diagram illustrating controlling an IoT device located in a specific place based on a specific user voice or a specific wearable device according to an embodiment of the disclosure.

FIG. 17 is a diagram illustrating controlling an IoT device located in a specific place based on a specific user voice or a specific wearable device according to an embodiment of the disclosure.

If a voice command for controlling a specific IoT device is received, the processor 230 may identify the characteristic of a voice of a user who uttered the voice command. Specifically, the processor 230 may identify the characteristic of a voice of a user based on the energy, the frequency bandwidth, the voice to noise ratio, etc. of the voice of the user.

Then, the processor 230 may identify whether a specific user uttered a voice command for controlling an IoT device located in a specific place for a number of times equal to or greater than a predetermined number of times, based on the characteristic of the voice of the user.

Here, a predetermined number of times may be set in various ways according to a user command. For example, a predetermined number of times may be set as 50 times.

Also, in the case that it is identified that a specific user uttered a voice command for controlling an IoT device located in a specific place for a number of times equal to or greater than a predetermined number of times, the processor 230 may match the aforementioned specific place with the aforementioned specific user, and store the place.

For example, in the case that a user A controlled a light located in a room 1 for a number of times equal to or greater than a predetermined number of times, the processor 230 may match the user A with the room 1, and store the place.

As described above, the electronic apparatus 200 according to an embodiment of the disclosure may match a specific place for each user, and store the place.

Accordingly, in a state wherein there are a plurality of places having the same name in a home, if a voice command for controlling an IoT device located in a place having the name is received, the electronic apparatus 200 according to an embodiment of the disclosure may identify the user A who uttered the voice command, and control the IoT device located in the place matched with the identified user.

Referring to FIG. 17, in the case that there are three rooms in a home, and a user A uttered a voice command such as "Turn on the light in my room" in a specific place 1510, the processor 230 may identify that the user who uttered the voice command is the user A based on the characteristic of the voice of the user. Then, the processor 230 may identify a room 1 1520 matched with the user A among the plurality of rooms, and control the power of the light located in the room 1 1520 among a plurality of lights located in the home.

Meanwhile, if it is identified that a wearable device 300 was located in a specific place for a time period equal to or greater than a predetermined time period, the processor 230 may match the wearable device 300 with the specific place, and store the place.

For example, if it is identified that a wearable device 300 was located in a room 1 for 8 consecutive hours or more, the processor 230 may match the wearable device 300 with the room 1, and store the place.

Accordingly, in a state wherein there are a plurality of places having the same name in a home, if a voice command for controlling an IoT device located in a place having the name is received, the electronic apparatus 200 according to an embodiment of the disclosure may identify the wearable device 300 that transmitted the voice command, and control the IoT device located in the place matched with the identified wearable device 300.

For example, as illustrated in FIG. 17, in the case that there are three rooms in a home, and a user A wearing a wearable device 300 uttered a voice command such as "Turn on the light in my room" in a specific place 1510, the processor 230 may receive the voice command from the wearable device 300, identify a room 1 1520 matched with the wearable device 300 among the plurality of rooms, and control the power of the light located in the room 1 1520 among a plurality of lights located in the home.

Figure 18:
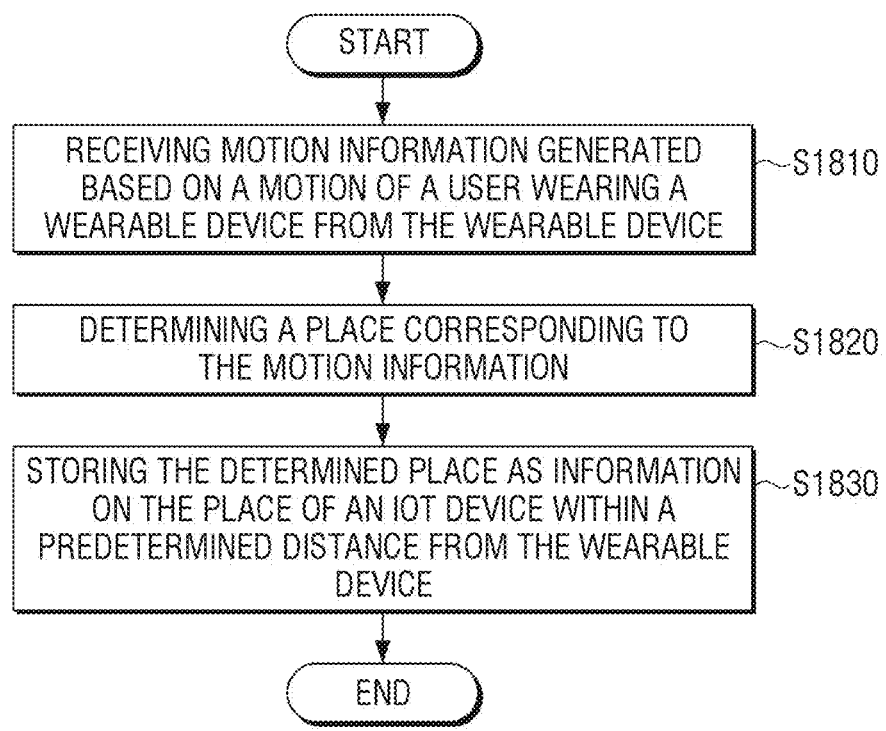
FIG. 18 is a flow chart illustrating an operation of an electronic apparatus according to an embodiment of the disclosure.

FIG. 18 is a flow chart illustrating an operation of an electronic apparatus according to an embodiment of the disclosure.

The electronic apparatus 200 may receive motion information generated based on a motion of a user wearing a wearable device 300 from the wearable device 300 at operation S1810.

Here, motion information may be generated based on a motion of a user wearing a wearable device 300.

For example, in the case that a user wearing a wearable device 300 around his wrist picked up a remote controller and put it down, the electronic apparatus 200 may receive motion information including information that the wearable device 300 was moved from up to down from the wearable device 300.

Then, the electronic apparatus 200 may identify an activity corresponding to the received motion information.

Specifically, the electronic apparatus 200 may identify an activity corresponding to motion information through machine learning.

For example, in the case that motion information that a wearable device 300 was moved from up to down is received from the wearable device 300, the electronic apparatus 200 may identify that a user picked up a remote controller and put it down through machine learning, and that the activity of the user wearing the wearable device 300 is a TV watching activity.

Then, based on the activity of the user, the electronic apparatus 200 may identify a place corresponding to motion information at operation S1820.

For this, the electronic apparatus 200 may use information on places matched with each of a plurality of activities stored in the electronic apparatus 200.

Here, information on places matched with each of a plurality of activities may be information on places matched with activities, such as a TV watching activity to which the living room is matched, a dining activity to which the kitchen is matched, and a washing activity to which the bathroom is matched.

Further, the electronic apparatus 200 may identify a place corresponding to motion information of the user based on the information on places matched with each of a plurality of activities.

As in the aforementioned embodiment, in the case that it is identified that an activity corresponding to motion information is a TV watching activity, the electronic apparatus 200 may identify the living room which is a place matched with a TV watching activity as a place corresponding to motion information.

Then, the electronic apparatus 200 may store the identified place as information on the place of an IoT device within a predetermined distance from a wearable device 300 at operation S1830.

Specifically, the electronic apparatus 200 may receive location information from each of a wearable device 300 and an IoT device, and if it is identified that the IoT device is within a predetermined distance from the wearable device 300, the electronic apparatus 200 may store the information on a place identified from motion information as information on the place of the IoT device.

For example, if it is identified that a place corresponding to motion information is the living room, and that a TV is located within a radius of 1m from a wearable device 300, the electronic apparatus 200 may match the living room with the TV, and store the place.

Through a method as described above, the electronic apparatus 200 may match a place for each IoT device, and store the place.

Accordingly, in the case that a voice command such as "Turn on the TV in the living room" is received from a user, the electronic apparatus 200 may identify a TV in the living room among a plurality of TVs located in a home, and control the power of the TV in the living room.

Figure 19:
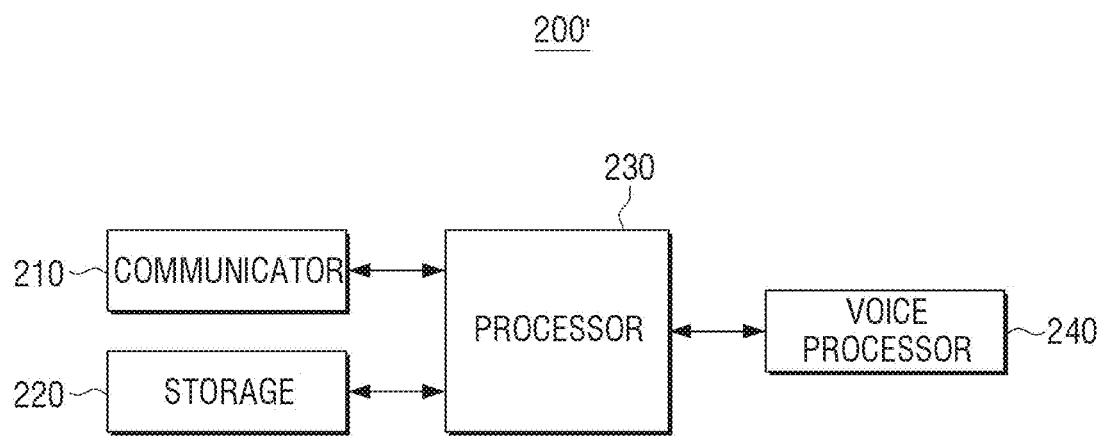
FIG. 19 is a block diagram of an electronic apparatus according to an embodiment of the disclosure.

FIG. 19 is a block diagram of an electronic apparatus according to an embodiment of the disclosure.

Referring to FIG. 19, the electronic apparatus 200' according to an embodiment of the disclosure may include a communicator 210, a storage 220, a voice processor 240, and a processor 230. Hereinafter, for parts that overlap with the aforementioned parts, explanation will be omitted or abridged.

The storage 220 may store an operating system (OS) for controlling the overall operations of the components of the electronic apparatus 200' and commands or data related to the components of the electronic apparatus 200'.

Accordingly, the processor 230 may control a plurality of hardware or software components of the electronic apparatus 200' by using various commands or data stored in the storage 220, load commands or data received from at least one of other components on a volatile memory and process the commands or data, and store various data in a non-volatile memory.

The processor 230 is a component controlling the overall operations of the electronic apparatus 200'.

Specifically, the processor 230 includes a random access memory (RAM) (not shown), a read-only memory (ROM) (not shown), a CPU (not shown), first to $n^{th}$ interfaces (not shown), and a bus (not shown). Here, the RAM, the ROM, the CPU, the first to $n^{th}$ interfaces, etc. may be connected to one another through the bus.

The processor 230 may identify an activity corresponding to motion information received from a wearable device 300. Then, the processor 230 may identify a place matched with the activity, and store the identified place as information on the place of an IoT device within a predetermined distance from the wearable device 300.

Meanwhile, the processor 230 may be applied to various fields such as the field of elderly care.

Specifically, the processor 230 may identify whether a situation is a situation wherein a user is in danger based on the activity of the user identified through machine learning and state information of an IoT device.

Here, state information may be information detected by a sensor of the IoT device.

For example, in a state wherein state information that a user was lying on the bed was received from the bed seven hours before the current time, and state information that the user is not lying on the bed was received from the bed at the current time, if it is identified that the current activity of the user is a sleeping activity, the processor 230 may identify that the user fell from the bed.

Afterwards, the processor 230 may protect the user in a dangerous situation, by transmitting a warning message that a fall of the user was detected to a user terminal apparatus etc. of the guardian.

The voice processor 240 may convert a voice signal received from an IoT device to a text. According to an embodiment of the disclosure, the voice processor 240 may convert a voice signal to a text by using a speech to text (STT) algorithm.

Meanwhile, methods according to the aforementioned various embodiments of the disclosure may be implemented only by software/hardware upgrade of conventional electronic apparatuses.

Also, the aforementioned various embodiments of the disclosure may be implemented through an embedded server provided on an electronic apparatus 200, or an external server.

Meanwhile, in the case that the electronic apparatus 200' according to an embodiment of the disclosure is implemented as a display apparatus like a smart TV, the electronic apparatus 200' may further include a display (not shown), a microphone (not shown), an image receiver (not shown), an audio outputter (not shown), and various sensors (not shown).

Meanwhile, a non-transitory computer readable medium storing a program sequentially performing the control method of an electronic apparatus 200 according to the disclosure may be provided.

Specifically, a non-transitory computer readable medium may include the steps of receiving motion information generated based on a motion of a user wearing a wearable device 300 from the wearable device 300, identifying a place corresponding to the motion information, and storing the identified place as information on the place of an IoT device within a predetermined distance from the wearable device 300.

Meanwhile, a non-transitory computer readable medium refers to a medium that stores data semi-permanently, and is readable by machines, but not a medium that stores data for a short moment such as a register, a cache, and a memory. Specifically, the aforementioned various applications or programs may be provided while being stored in non-transitory computer readable media such as a compact disc (CD), a digital versatile disc (DVD), a hard disk, a Blu-ray disc, a USB, a memory card, a ROM, and the like.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic apparatus comprising:
   a communicator;
   a storage; and
   a processor configured to:
      receive motion information from a wearable device, when the motion information is generated based on a motion of the wearable device,
      obtain information regarding a user activity corresponding to the motion information,
      identify a location corresponding directly to the motion information of the wearable device based on the information regarding the user activity corresponding to the motion information,
      identify, from among a plurality of Internet of Things (IoT) devices by comparing a signal strength of each of the plurality of IoT devices to the wearable device, an IoT device located within a preset distance from the identified location,
      store location information indicating that the identified IoT device is located in the identified location, and
      based on receiving a control signal for controlling one of the plurality of IoT devices located in the identified location through the communicator, control the identified IoT device located in the identified location based on the location information.

2. The electronic apparatus of claim 1, wherein the processor is further configured to:
   based on a voice command for controlling the IoT device located in the identified location being received, identify a characteristic of a voice of a user who uttered the voice command,
   based on identifying that a specific user uttered the voice command for controlling the IoT device located in the identified location for a number of times equal to or greater than a predetermined number of times, based on the characteristic of the voice, store the specific user by matching the user with the identified location, and
   based on the voice command for controlling the IoT device being received from the specific user, identify the identified location matched with the specific user among a plurality of locations having a same name, and control the IoT device according to the voice command.

3. The electronic apparatus of claim 1, wherein the processor is further configured to:
based on identifying that the wearable device was located in the identified location for a time period equal to or greater than a predetermined time period, store the wearable device by matching the wearable device with the identified location, and
based on a voice command for controlling the IoT device being received from the wearable device, identify the identified location matched with the wearable device among a plurality of locations having a same name, and control the IoT device according to the voice command.

4. The electronic apparatus of claim 1, wherein the wearable device is identified to be within a predetermined distance from the IoT device by using a beacon of a near field wireless communication device.

5. The electronic apparatus of claim 1,
wherein the storage stores information on locations matched with each of a plurality of activities, and
wherein the processor is further configured to:
identify, based on the motion information, the user activity of a user wearing the wearable device, the user activity corresponding to the motion information, and
identify, based on the identified user activity and the information on locations matched with each of the plurality of activities, the location corresponding to the motion information.

6. The electronic apparatus of claim 5, wherein the processor is further configured to:
based on identifying a plurality of activities corresponding to the motion information, identify a user activity corresponding to the motion information among the plurality of identified activities based on sound information of IoT devices received from the wearable device.

7. The electronic apparatus of claim 5, wherein the processor is further configured to:
based on identifying a plurality of activities corresponding to the motion information, identify a user activity corresponding to the motion information among the plurality of identified activities based on state information of a plurality of IoT devices located in locations matched with the plurality of identified activities.

8. The electronic apparatus of claim 7, wherein the processor is further configured to:
identify states of powers of the plurality of IoT devices located in the locations matched with the plurality of identified activities,
identify a user activity related to an IoT device of which power is in a turned-on state among the plurality of identified activities, and
store location information of a location matched with the identified user activity as information on the location of the IoT device, in the storage.

9. The electronic apparatus of claim 7, wherein the processor is further configured to:
identify states of powers of the plurality of IoT devices located in the locations matched with the plurality of identified activities and weights set for the plurality of IoT devices,
identify a user activity among the plurality of identified activities based on the states of the powers and the weights, and
store location information of a location matched with the identified user activity as information on the location of the IoT device, in the storage.

10. The electronic apparatus of claim 9, wherein the processor is further configured to:
based on the powers of the plurality of IoT devices being in a turned-on state, store location information of a location matched with a user activity related to an IoT device having a highest weight among the plurality of IoT devices based on the weights as information on the location of the IoT device, in the storage.

11. The electronic apparatus of claim 9, wherein the processor is further configured to:
based on the powers of the plurality of IoT devices being in a turned-off state, or powers of some IoT devices among the plurality of IoT devices being in a turned-on state and powers of remaining IoT devices being in the turned-off state, adjust the weights set for the IoT devices of which the powers are in the turned-off state based on a time when the powers of the IoT devices of which the powers are in the turned-off state were turned off, and
store location information of a location matched with a user activity related to an IoT device having a highest weight among the plurality of IoT devices based on the weights as information on the location of the IoT device, in the storage.

12. A control method of an electronic apparatus comprising:
receiving motion information from a wearable device, when the motion information is generated based on a motion of the wearable device;
obtaining information regarding a user activity corresponding to the motion information;
identifying a location corresponding directly to the motion information of the wearable device based on the information regarding the user activity corresponding to the motion information;
identify, from among a plurality of Internet of Things (IoT) devices by comparing a signal strength of each of the plurality of IoT devices to the wearable device, an IoT device located within a preset distance from the identified location,
storing location information indicating that the identified IoT device is located in the identified location;
receiving a control signal for controlling one of the plurality of IoT device located in the identified location; and
controlling the identified IoT device located in the identified location based on the location information.

13. The control method of claim 12, wherein the controlling comprises:
based on a voice command for controlling the IoT device located in the identified location being received, identifying a characteristic of a voice of a user who uttered the voice command,
based on identifying that a specific user uttered the voice command for controlling the IoT device located in the identified location for a number of times equal to or greater than a predetermined number of times, based on the characteristic of the voice, storing the specific user by matching the user with the identified location, and
based on the voice command for controlling the IoT device being received from the specific user, identifying the identified location matched with the specific user among a plurality of locations having a same name, and controlling the IoT device according to the voice command.

14. The control method of claim 12, wherein the controlling comprises:

based on identifying that the wearable device was located in the identified location for a time period equal to or greater than a predetermined time period, storing the wearable device by matching the wearable device with the identified location, and based on a voice command for controlling the IoT device being received from the wearable device, identifying the identified location matched with the wearable device among a plurality of locations having a same name, and controlling the IoT device according to the voice command.

15. The control method of claim 12, wherein the identifying further comprises:

based on identifying a plurality of activities corresponding to the motion information, identifying a user activity corresponding to the motion information among the plurality of identified activities based on sound information of IoT devices received from the wearable device.

16. The control method of claim 12, wherein the identifying comprises:

based on the motion information, identifying a user activity of a user wearing the wearable device corresponding to the motion information, and based on the identified user activity and information on locations matched with each of a plurality of activities, identifying the location corresponding to the motion information.

17. The control method of claim 16, wherein the identifying further comprises:

based on identifying a plurality of activities corresponding to the motion information, identifying a user activity corresponding to the motion information among the plurality of identified activities based on state information of a plurality of IoT devices located in locations matched with the plurality of identified activities.

18. The control method of claim 17, wherein the storing comprises:

identifying states of powers of the plurality of IoT devices located in the locations matched with the plurality of identified activities, identifying a user activity related to an IoT device of which power is in a turned-on state among the plurality of identified activities, and storing location information of a location matched with the identified user activity as information on the location of the IoT device.

19. The control method of claim 17, wherein the storing comprises:

identifying states of powers of the plurality of IoT devices located in the locations matched with the plurality of identified activities and weights set for the plurality of IoT devices, identifying a user activity among the plurality of identified activities based on the states of powers and the weights, and storing location information of a location matched with the identified user activity as information on the location of the IoT device.

20. The control method of claim 19, wherein the storing further comprises:

based on the powers of the plurality of IoT devices being in a turned-on state, storing location information of a location matched with a user activity related to an IoT device having a highest weight among the plurality of IoT devices based on the weights as information on the location of the IoT device.

21. The control method of claim 19, wherein the storing further comprises:

based on the powers of the plurality of IoT devices being in a turned-off state, or powers of some IoT devices among the plurality of IoT devices being in a turned-on state and powers of remaining IoT devices being in the turned-off state, adjusting the weights set for the IoT devices of which the powers are in the turned-off state based on a time when the powers of the IoT devices of which the powers are in the turned-off state were turned off, and storing location information of a location matched with a user activity related to an IoT device having a highest weight among the plurality of IoT devices based on the weights as information on the location of the IoT device.

* * * * *